(12) United States Patent
Kanagawa et al.

(10) Patent No.: US 7,407,220 B2
(45) Date of Patent: Aug. 5, 2008

(54) VEHICLE FRONT STRUCTURE

(75) Inventors: Junya Kanagawa, Hadano (JP);
Hideyoshi Takashima, Isehara (JP);
Itaru Nakamura, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/882,985

(22) Filed: Aug. 8, 2007

(65) Prior Publication Data

US 2008/0036243 A1 Feb. 14, 2008

(30) Foreign Application Priority Data

Aug. 9, 2006 (JP) ............................. 2006-216841

(51) Int. Cl.
*B62D 25/08* (2006.01)
(52) U.S. Cl. ............. 296/187.09; 296/192; 296/193.06; 296/203.02
(58) Field of Classification Search ............ 296/187.09, 296/187.1, 187.12, 192, 193.05, 193.06, 296/193.09, 198, 203.02, 203.03, 205, 193.02, 296/29; 280/784
See application file for complete search history.

(56) References Cited

U.S. PATENT DOCUMENTS

| | | | |
|---|---|---|---|
| 4,717,198 A | | 1/1988 | Komatsu |
| 4,750,780 A | * | 6/1988 | Harasaki et al. .............. 296/192 |
| 4,883,309 A | * | 11/1989 | Miyazaki et al. ........ 296/193.09 |
| 5,031,958 A | * | 7/1991 | Fujita et al. ............. 296/203.02 |
| 5,052,742 A | * | 10/1991 | Akoshima et al. ........... 296/192 |
| 5,061,009 A | * | 10/1991 | Harasaki et al. .............. 296/192 |
| 5,269,583 A | | 12/1993 | Maeda |
| 5,314,229 A | * | 5/1994 | Matuzawa et al. ..... 296/187.09 |
| 6,053,564 A | * | 4/2000 | Kamata et al. .......... 296/187.09 |
| 6,209,950 B1 | * | 4/2001 | Hanyu .................... 296/203.02 |
| 6,273,498 B1 | * | 8/2001 | Hillman et al. ......... 296/203.01 |
| 6,332,642 B1 | * | 12/2001 | Hanyu .................... 296/203.02 |
| 6,499,798 B2 | * | 12/2002 | Takemoto .............. 296/203.02 |
| 6,572,180 B2 | * | 6/2003 | Kim ....................... 296/203.02 |
| 6,655,728 B2 | * | 12/2003 | Sano et al. ............. 296/187.09 |
| 7,080,875 B2 | * | 7/2006 | Kim ....................... 296/187.09 |
| 7,083,225 B2 | * | 8/2006 | Yakata et al. ........... 296/203.04 |
| 7,140,668 B2 | * | 11/2006 | Wesch et al. ............ 296/187.02 |
| 7,140,674 B2 | * | 11/2006 | Miyoshi et al. ......... 296/203.03 |
| 7,185,945 B2 | * | 3/2007 | Dandekar et al. ....... 296/187.09 |
| 7,229,113 B2 | * | 6/2007 | Lendway et al. .............. 296/30 |

(Continued)

FOREIGN PATENT DOCUMENTS

EP 0 328 456 A2 8/1989

(Continued)

*Primary Examiner*—Jason S Morrow
(74) *Attorney, Agent, or Firm*—Foley & Lardner LLP (57) ABSTRACT

A vehicle front structure including: a closed-section cross member connected to a pair of front pillars; a closed-section hood ledge extending frontward from a portion of a corresponding one of the front pillars, where the cross member is connected to the corresponding one of the front pillars; and a strut housing provided on an inner side in a vehicle transverse direction of and adjacent to the hood ledge. The hood ledge is provided with two gussets dividing an internal space thereof into sections in the longitudinal direction of the hood ledge, and an intermediate portion of the hood ledge between the two gussets is located forward of the cross member and rearward of the strut housing.

4 Claims, 6 Drawing Sheets

U.S. PATENT DOCUMENTS

| | | | |
|---|---|---|---|
| 2001/0033094 A1* | 10/2001 | Sano et al. | 296/194 |
| 2002/0063444 A1* | 5/2002 | Kim | 296/203.02 |
| 2002/0074830 A1* | 6/2002 | Takemoto | 296/203.02 |
| 2005/0046237 A1* | 3/2005 | Miyoshi et al. | 296/203.02 |
| 2006/0097533 A1* | 5/2006 | Watanabe et al. | 296/30 |
| 2007/0252412 A1* | 11/2007 | Yatsuda | 296/193.09 |

FOREIGN PATENT DOCUMENTS

JP 10-203413 A 8/1998

* cited by examiner

VEHICLE FRONT STRUCTURE

BACKGROUND OF THE INVENTION

1. Field of the Invention

The present invention relates to a vehicle front structure.

2. Description of the Related Art

Japanese Patent Application Laid-open Publication No. Hei. 10(1998)-203413 discloses a vehicle front structure including: an air box connected between a pair of front pillars; a hood ledge having a closed section structure and extending frontward from a part of the front pillar at the level of the air box; and a strut housing provided on the inner side in the vehicle transverse direction of and adjacent to the hood ledge.

SUMMARY OF THE INVENTION

In the vehicle front structure, however, the hood ledge has high rigidity and strength. Therefore, a relatively large load may be transmitted to the front pillars through the hood ledge being not broken or deformed during a frontal collision or the like. This may necessitate the front pillars to be more rigid and stronger, causing an increase in the weight of the vehicle.

An object of the present invention is to provide a vehicle front structure in which the hood ledge is caused to deform to thereby efficiently absorb an impact during a frontal collision or the like.

An aspect of the present invention is a vehicle front structure including: a closed-section cross member connected to a pair of front pillars; a closed-section hood ledge extending frontward from a portion of a corresponding one of the front pillars, where the cross member is connected to the corresponding one of the front pillars; and a strut housing provided on an inner side in a vehicle transverse direction of and adjacent to the hood ledge, wherein the hood ledge is provided with two gussets dividing an internal space thereof into sections in the longitudinal direction of the hood ledge, and an intermediate portion of the hood ledge between the two gussets is located forward of the cross member and rearward of the strut housing.

BRIEF DESCRIPTION OF THE DRAWINGS

The invention will now be described with reference to the accompanying drawings wherein.

DESCRIPTION OF THE PREFERRED EMBODIMENTS

An embodiment of the present invention will be explained below with reference to the drawings. It should be noted that reference symbol FR denotes forward/frontward in the longitudinal direction of the vehicle; IN, toward the inner side in the transverse direction of the vehicle; and UP, upward.

Figure 1:
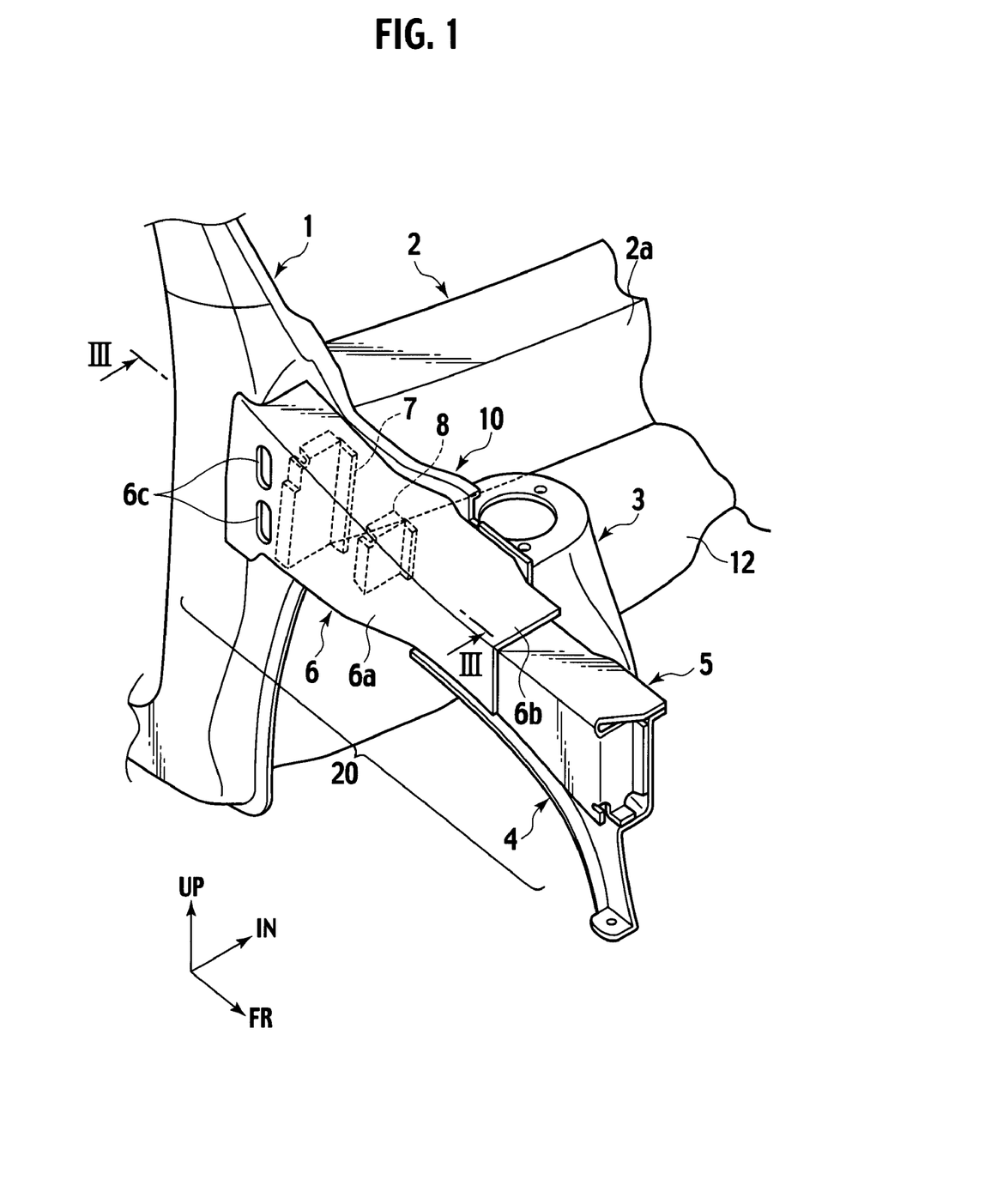
FIG. 1 is a perspective view of a vehicle front structure according to an embodiment of the present invention.
Figure 2:
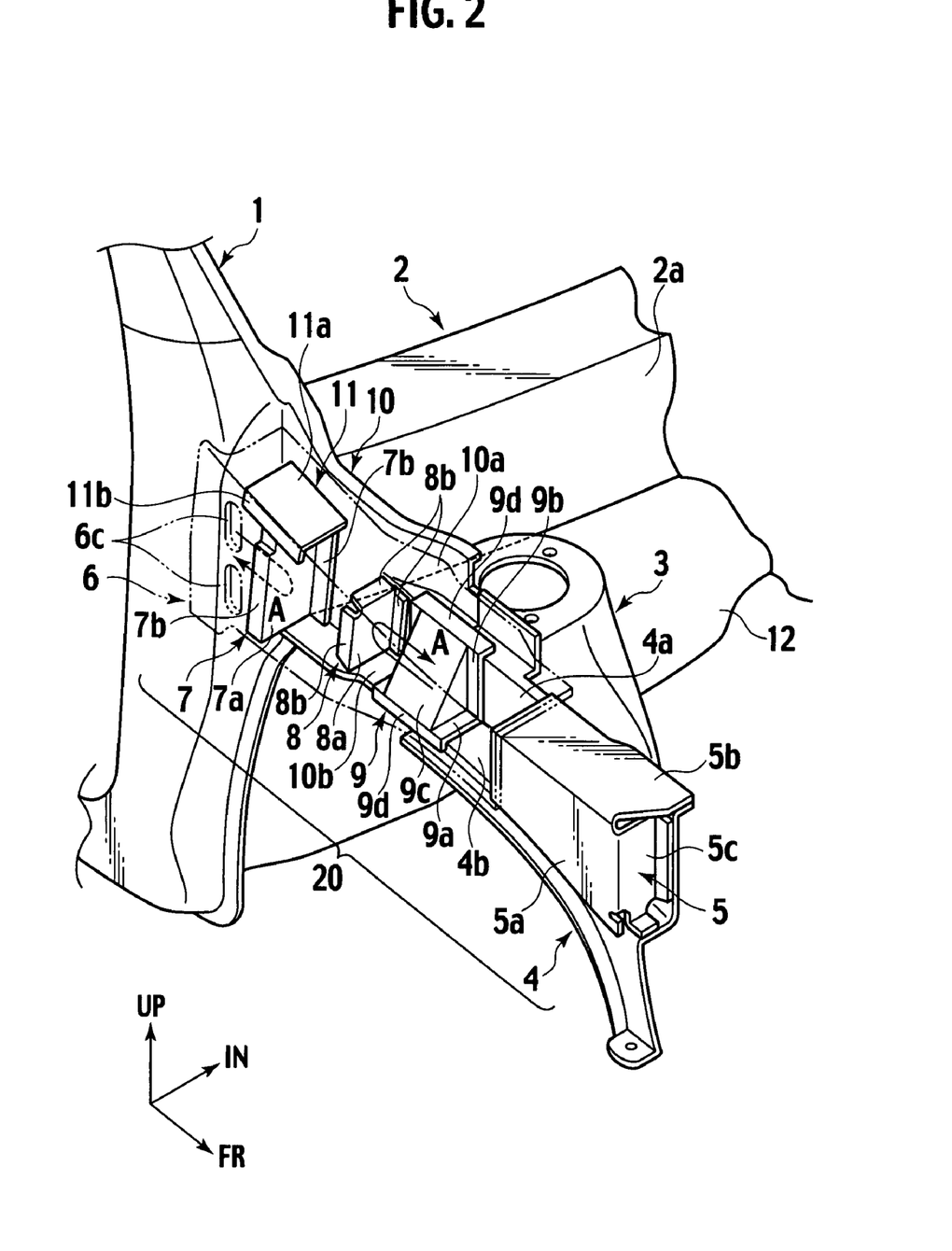
FIG. 2 is a perspective view showing an interior of a hood ledge in the vehicle front structure according to the embodiment of the present invention.

In the embodiment of the present invention, a pair of front pillars 1 are arranged on the right and left sides of the vehicle (only a front pillar on one side of the vehicle is shown in each of the drawings). An air box 2 having a closed section structure (a closed-section cross member) extends between the front pillars 1. The air box 2 is joined at both ends in the vehicle transverse direction thereof to the respective front pillars 1 at substantially central portions in the vertical direction of the front pillars 1. In addition, hood ledges 20 are provided to extend frontward from the respective front pillar 1. Each of the hood ledges 20 has a closed section structure and extends from a portion of the corresponding front pillar 1 where the air box 2 is connected to the front pillar 1 at the height level of the air box 2. Furthermore, strut housings 3 are respectively provided adjacent to and on inner sides in the vehicle transverse direction of the hood ledges 20. It should be noted that reference numeral 12 in FIGS. 1, 2 and 5 denotes a dash lower panel.

The hood ledge 20 includes: a hood ledge inner rear 10 formed by extending the substantially central portion of the front pillar 1 in the vertical direction frontward; a hood ledge inner front 4 connected at a rear end thereof to a front end of the hood ledge inner rear 10 and extends frontward therefrom; and a hood ledge outer reinforcement rear 6 and a hood ledge outer reinforcement front 5 provided on outer sides in the vehicle transverse direction of the hood ledge inner rear 10 and the hood ledge inner front 4, respectively. The hood ledge inner rear 10, the hood ledge inner front 4, the hood ledge outer reinforcement rear 6 and the hood ledge outer reinforcement front 5 are joined by spot welding or the like to be an integral unit.

The hood ledge inner rear 10 and the hood ledge inner front 4 on the inner side in the vehicle transverse direction are formed to have a cross section in a shape of a letter "L". The hood ledge inner rear 10 has the "L" shaped cross section including a side inner wall 10a and a bottom wall 10b. The hood ledge inner front 4 has the "L" shaped cross section including a side inner wall 4a and a bottom wall 4b. The hood ledge outer reinforcement rear 6 and the hood ledge outer reinforcement front 5 on the outer side in the vehicle transverse direction are formed to have a cross section in a shape of a letter "L". The hood ledge outer reinforcement rear 6 has the "L" shaped cross section including a side outer wall 6a and a top wall 6b. The hood ledge outer reinforcement front 5 has the "L" shaped cross section including a side outer wall 5a and a top wall 5b. The hood ledge 20 has a closed section structure having an internal space being substantially rectangular in cross section, across all the sections in the longitudinal direction (a box-section structure). The internal space is closed at the front end thereof by an end wall 5c of the hood ledge outer reinforcement front 5.

Furthermore, two gussets 7 and 8 are provided in the internal space in a rear portion of the hood ledge 20. These gussets 7 and 8 divide the internal space of the hood ledge 20 into three sections in the longitudinal direction.

Figure 4:
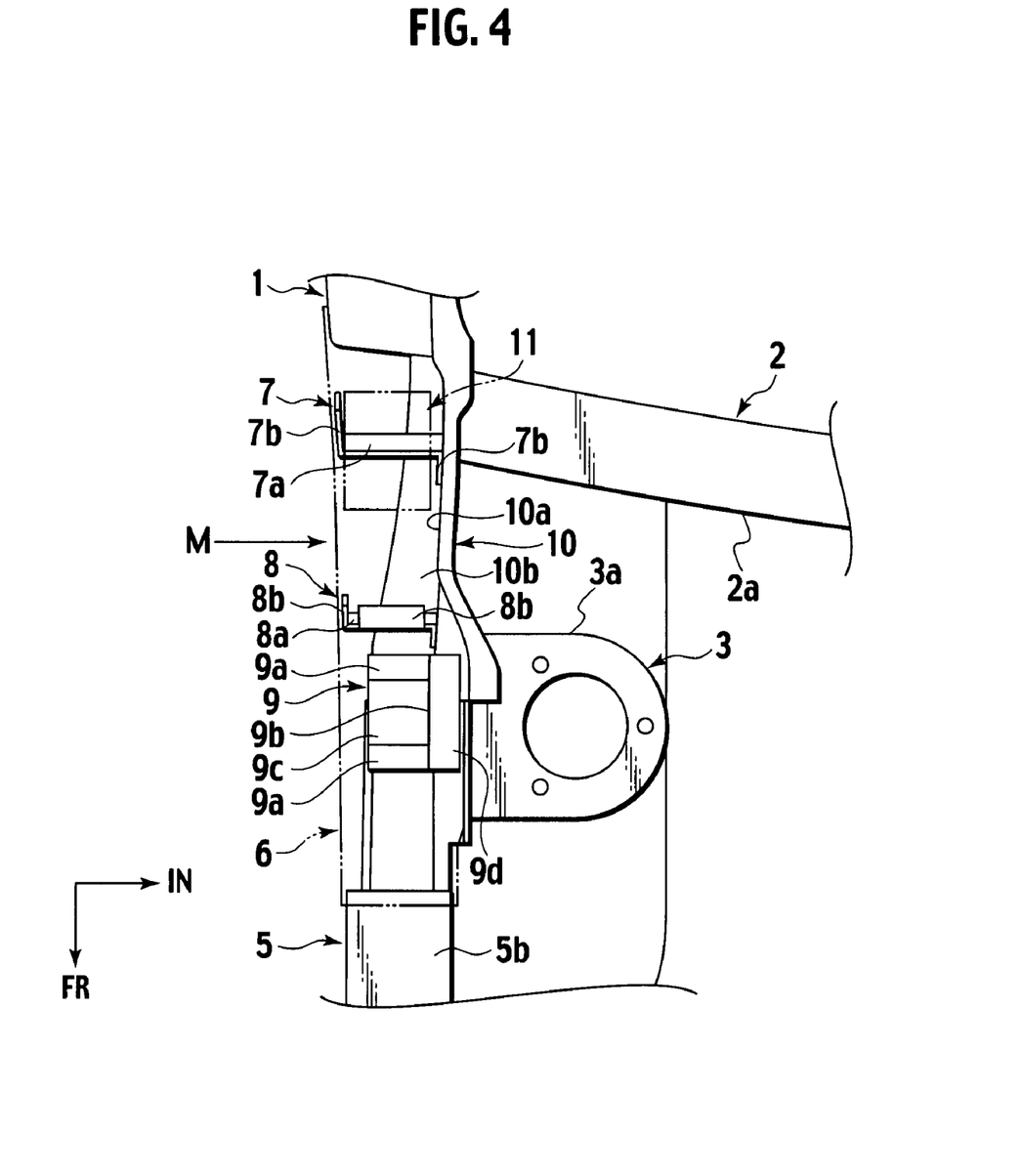
FIG. 4 is a plan view showing the interior of the hood ledge in the vehicle front structure according to the embodiment of the present invention.

The rear gusset 7 is located close to the front pillar 1. The gusset 7 includes: a rectangular shielding wall portion 7a extending over the cross section of the internal space; and joint flanges 7b provided on respective peripheral edges (four sides) of the shielding wall portion 7a. The gusset 7 is fixed to the inside of the hood ledge 20 with the joint flanges 7b joined to the side inner wall 10a, the side outer wall 6a, the top wall 6b (reinforcement plate 11) and the bottom wall 10b of the hood ledge 20, respectively. In the present embodiment, the shielding wall portion 7a is arranged adjacent to and on the outer side in the vehicle transverse direction of a front wall 2a of the air box 2, or at the same position in the vehicle longitudinal direction as that of the front wall 2a of the air box 2, as shown in FIG. 4. Incidentally, the reinforcement plate 11 including a rectangular top board 11a and a joint flange 11b is provided on the top of the gusset 7.

The front gusset 8 includes: a rectangular shielding wall portion 8a extending over the cross section of the internal space; and joint flanges 8b provided on respective peripheral edges (four sides) of the shielding wall portion 8a. The gusset 8 is fixed to the inside of the hood ledge 20 with the joint flanges 8b joined to the side inner wall 10a, the side outer wall 6a, the top wall 6b (reinforcement plate 11) and the bottom wall 10b of the hood ledge 20, respectively. In the present embodiment, the shielding wall portion 8a is arranged adjacent to and on the outer side in the vehicle transverse direction of a rear end part 3a of the strut housing 3, or at the same position in the vehicle longitudinal direction as that of the rear end part 3a of the strut housing 3, as shown in FIG. 4.

Moreover, in the case of the present embodiment, a brace 9 is arranged at a boundary section (a joint) between the hood ledge inner rear 10 and the hood ledge inner front 4, and is joined to the inside of the hood ledge 20. The brace 9 includes: a bottom wall 9a, a side wall 9b and joint flanges 9d which are all fixed to the inside of the hood ledge 20; and an inclined wall 9c joining a top portion of the hood ledge 20 on the inner side in the vehicle transverse direction and a lower portion of the hood ledge 20 on the outer side in the vehicle transverse direction. The brace 9 increases the rigidity and strength of the hood ledge 20.

Figure 3:
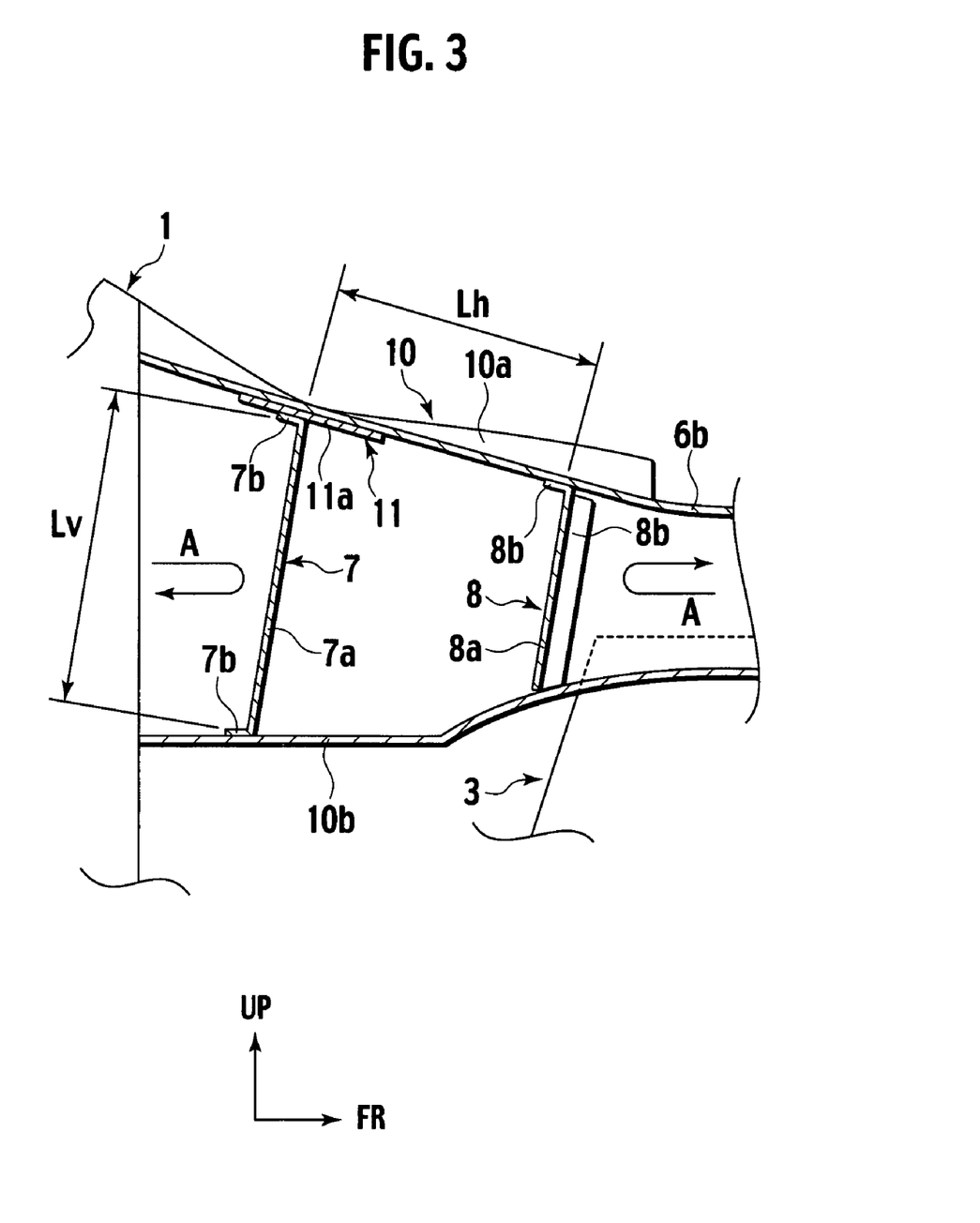
FIG. 3 is a cross-sectional view of the vehicle front structure taken along the III-III line of FIG. 1.
Figure 5:
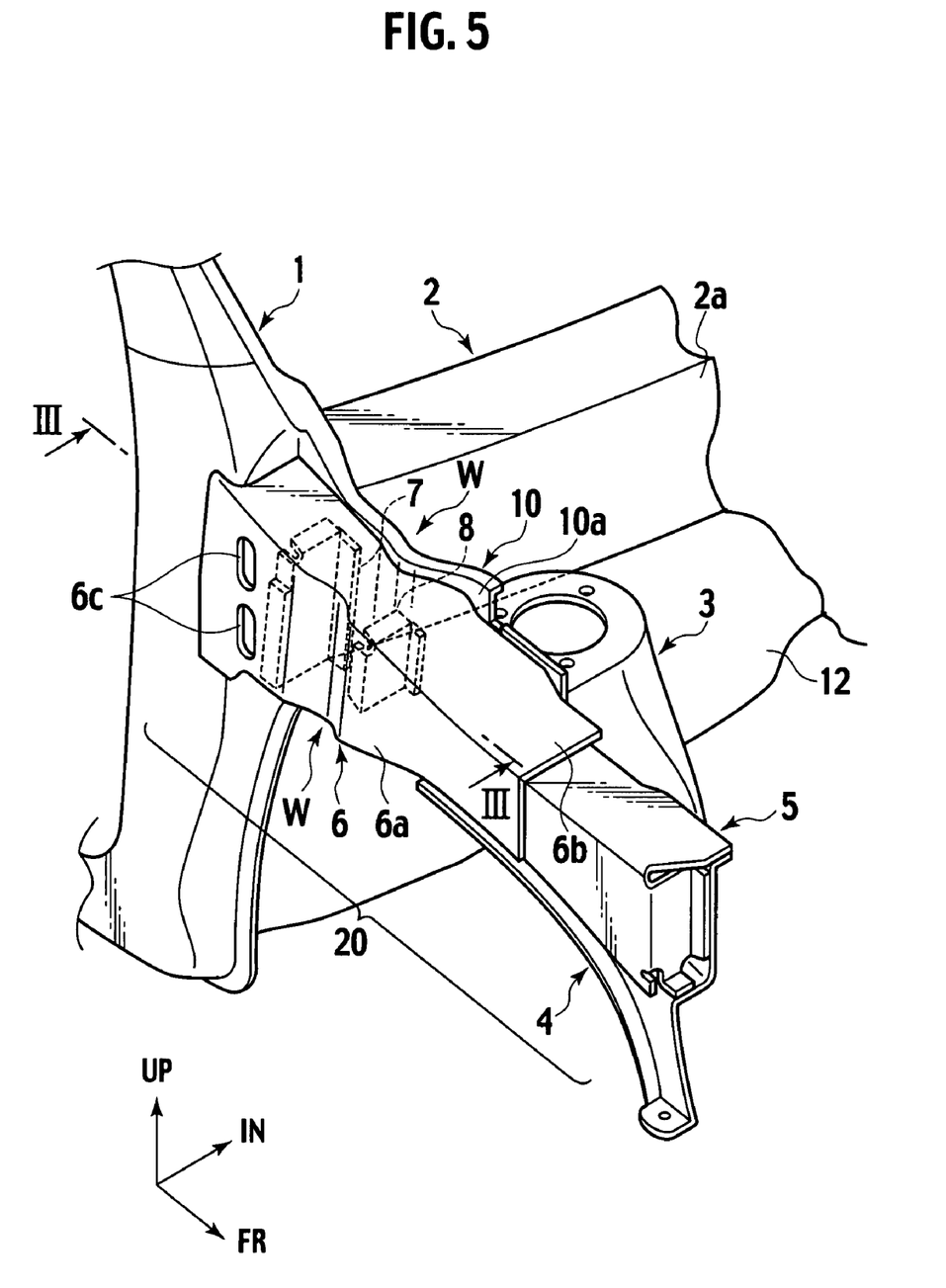
FIG. 5 is a perspective view showing a hood ledge deformed in the frontal collision or the like, in the vehicle front structure according to the embodiment of the present invention.

In the case of the present embodiment, the longer (higher) gusset (rear gusset 7) of the two gussets 7 and 8 which are arranged substantially in parallel to each other, has the vertical length (height) Lv longer than the distance (shortest distance) Lh between the two gussets 7 and 8, as shown in FIG. 3. When the vertical length Lv is set longer than the distance Lh, wrinkles W can be formed easily in the section between the two gussets 7 and 8. In the present embodiment, the vertical wrinkles W having wavy ridges or furrows running in the vertical direction and providing convexes and concaves in the vehicle transverse direction are formed in the side outer wall 6a and the side inner wall 10a of the hood ledge 20, as shown in FIGS. 5 and 6, when the side outer wall 6a and the side inner wall 10a buckle at a section between the two gussets 7 and 8 due to load from the front.

Figure 6:
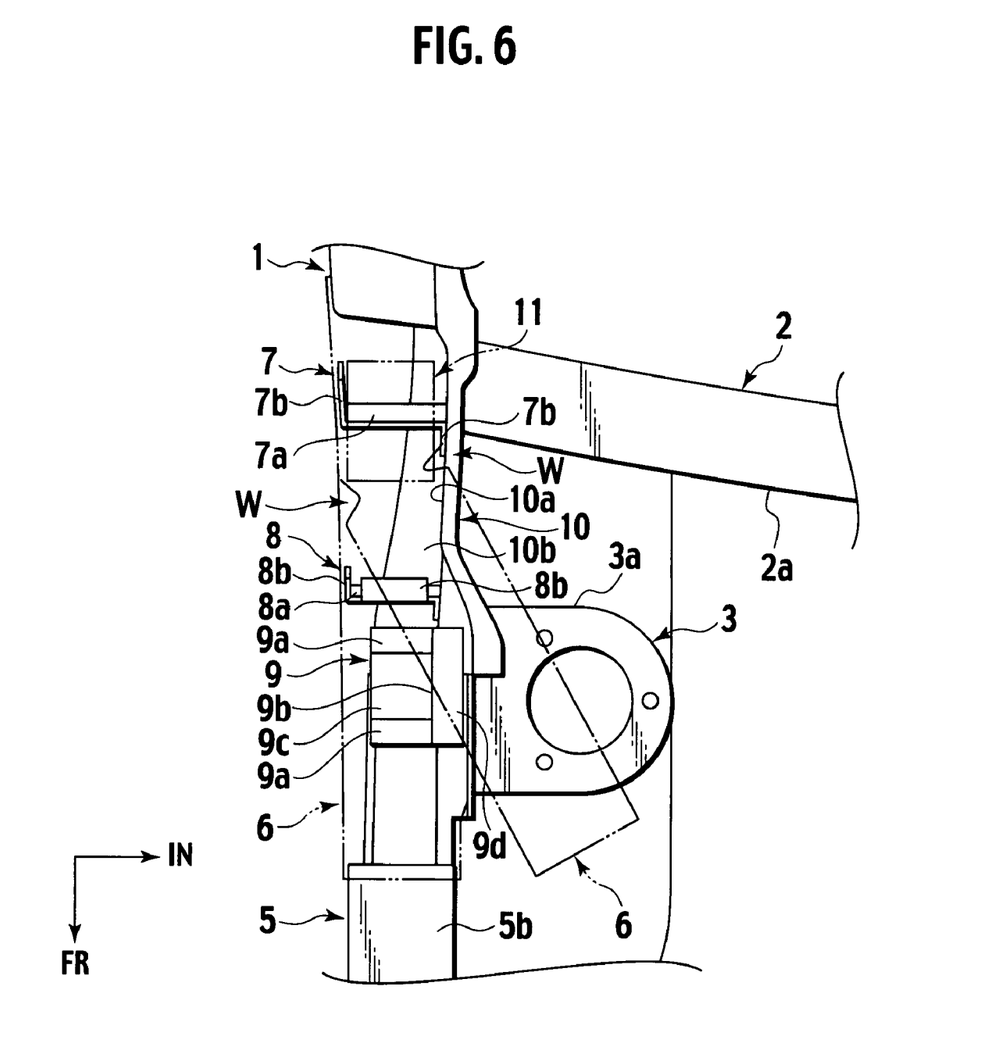
FIG. 6 is a plan view showing the hood ledge deformed in the frontal collision or the like, in the vehicle front structure according to the embodiment of the present invention.

Due to the formation of wrinkles W, the hood ledge 20 (the hood ledge outer reinforcement rear 6 in the case of FIG. 6) is bent sideways, for example, toward the strut housing 3, as shown in FIG. 6, and the strut housing 3 is deformed to absorb an impact.

It is desirable that, as shown in FIG. 6, the hood ledge 20 be bent in a direction which makes the hood ledge 20 interfere with the strut housing 3. It should be noted that, in a case where the hood ledge 20 is instead bent in the opposite direction, that is, in a direction which makes the hood ledge 20 apart from the strut housing 3, the deformation of the strut housing 3 connected to the hood ledge 20 (deformation resulting from the stretch of the strut housing 3 outward in the vehicle transverse direction) absorbs an impact.

Furthermore, in the case of the present embodiment, each of the two gussets 7 and 8 extends over the cross section of the internal space of the hood ledge 20. The gusset 7 prevents hot air which has entered the rear internal space of the hood ledge 20 via a through-hole 6c in the side outer wall 6a (indicated by an arrow A), from flowing forward through the internal space, as shown in FIG. 3. Moreover, the gusset 8 prevents hot air which has entered the front internal space of the hood ledge 20 (indicated by another arrow A), from flowing rearward. In other words, the two gussets 7 and 8 function as heat shield panels in the present embodiment.

In the case of the present embodiment, the two gussets 7 and 8 divide the internal space of the hood ledge 20 into three sections in the longitudinal direction and are arranged in a way that the intermediate portion (indicated by M in FIG. 4) between the two gussets 7 and 8 is located forward of the air box 2 and rearward of the strut housing 3, as described above. According to this structure, the rigidity and strength of the hood ledge 20 is relatively decreased in the vicinity of the intermediate portion M, which causes the intermediate portion to buckle due to an impact load inputted from the front during the frontal collision or the like. For this reason, in a case where load is inputted from the front, the load to be transmitted to the front pillar 1 can be reduced. The rigidity and strength of the front pillar 1 can thus be set lower, while suppressing an increase in the weight of the vehicle body.

In particular, since the intermediate portion M is arranged rearward of the strut housing 3, an impact load from the front can be transmitted more efficiently to the strut housing 3 connected to the hood ledge 20 being deformed, and thus causes the strut housing 3 to deform. This effect can be further strengthened by providing the brace 9 as the reinforcement member in a location forward of the intermediate portion M, particularly in a location inside the hood ledge 20, where the hood ledge 20 is connected to the strut housing 3.

Moreover, in the case of the present embodiment, the gusset 7 to be arranged closer to the front pillar 1 out of the two gussets 7 and 8 is arranged adjacent to the front wall 2a of the air box 2. This makes it possible to increase the rigidity and strength of the hood ledge 20 in the part provided with the gusset 7, and to accordingly allow the hood ledge 20 to surely deform in the section between the gusset 7 and the front gusset 8.

Additionally, in the case of the present embodiment, the vertical length Lv of at least one (the rear gusset 7 in the present embodiment) of the two gussets 7 and 8 is set longer than the distance Lh between the two gussets 7 and 8. This makes it possible to more surely form the vertical wrinkles W in the side outer wall 6a and the side inner wall 10a of the hood ledge 20 in the section between the gussets 7 and 8 when a load is applied to the hood ledge 20 from the front. The vertical wrinkles W allows the hood ledge 20 to be surely bent sideway and causes the strut housing 3 to deform, whereby an impact is absorbed more efficiently.

Furthermore, in the case of the present embodiment, at least one of the two gussets 7 and 8 (both of the two gussets 7 and 8 in the present embodiment) extends over the cross section of the internal space of the hood ledge 20. This makes it possible to suppress hot air from flowing through the internal space of the hood ledge 20.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2006-216841, filed on Aug. 9, 2006, the disclosures of which is expressly incorporated herein by reference in its entirety.

What is claimed is:

1. A vehicle front structure comprising:
   a closed-section cross member connected to a pair of front pillars;
   a closed-section hood ledge extending frontward from a portion of a corresponding one of the front pillars, where the cross member is connected to the corresponding one of the front pillars; and
   a strut housing provided on an inner side in a vehicle transverse direction of and adjacent to the hood ledge,
   wherein the hood ledge is provided with two gussets dividing an internal space thereof into sections in the longitudinal direction of the hood ledge, and an intermediate portion of the hood ledge between the two gussets is located forward of the cross member and rearward of the strut housing.

2. The vehicle front structure according to claim 1, wherein one of the two gussets closer to the corresponding one of the front pillars is arranged adjacent to a front wall of the cross member.

3. The vehicle front structure according to claim 1, wherein at least one of the two gussets has a vertical length larger than a distance between the two gussets.

4. The vehicle front structure according to claim 1, wherein at least one of the two gussets extends over a cross section of the internal space of the hood ledge.

* * * * *